United States Patent
Kim et al.

(10) Patent No.: US 7,228,009 B2
(45) Date of Patent: Jun. 5, 2007

(54) GENERATING INTERPOLATED DISPLAY DATA USING REMOTE PIXEL DATA

(75) Inventors: Young-ro Kim, Seoul (KR); Ho-youn Choi, Gyeonggi-do (KR); Kee-sung Bae, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/815,281

(22) Filed: Apr. 1, 2004

(65) Prior Publication Data

US 2004/0257475 A1    Dec. 23, 2004

(30) Foreign Application Priority Data

Apr. 2, 2003    (KR)    ............ 10-2003-0020740

(51) Int. Cl.
*G06K 9/32* (2006.01)
*G09G 5/00* (2006.01)

(52) U.S. Cl. ............................ 382/300; 345/660
(58) Field of Classification Search ........ 345/660–671
See application file for complete search history.

(56) References Cited

U.S. PATENT DOCUMENTS

| | | | |
|---|---|---|---|
| 5,793,379 A | 8/1998 | Lapidous | 345/439 |
| 5,796,437 A | 8/1998 | Muraji et al. | 348/452 |
| 6,219,464 B1 * | 4/2001 | Greggain et al. | 382/298 |
| 6,714,242 B1 * | 3/2004 | Kobayashi | 348/272 |
| 6,816,166 B2 * | 11/2004 | Shimizu et al. | 345/581 |
| 2001/0055340 A1 * | 12/2001 | Kim et al. | 375/240.21 |
| 2004/0086201 A1 * | 5/2004 | Muresan et al. | 382/300 |

OTHER PUBLICATIONS

Vaidyanathan, P.P., "Multirate Digital Filters, Filter Banks, Polyphase Networks, and Applications: A Tutorial," *Proceedings of the IEEE*, 78, (1): 56-93 (Jan. 1990).

* cited by examiner

*Primary Examiner*—Ulka Chauhan
*Assistant Examiner*—Eric Woods
(74) *Attorney, Agent, or Firm*—Myers Bigel Sibley & Sajovec

(57) ABSTRACT

Interpolating pixel data in scaling pixel data for display can be provided by determining a pixel value at an interpolation location of a display based on filtering pixel data proximate to the interpolation location in a plurality of directions from the interpolation location. Related circuits and computer program products are also disclosed.

8 Claims, 4 Drawing Sheets

GENERATING INTERPOLATED DISPLAY DATA USING REMOTE PIXEL DATA

RELATED APPLICATION AND CLAIM FOR PRIORITY

This application claims the priority of Korean Patent Application No. 2003-20740, filed on Apr. 2, 2003, in the Korean Intellectual Property Office, the disclosure of which is incorporated herein in its entirety by reference.

FIELD OF THE INVENTION

The invention relates to imaging, and more particularly, to methods, interpolators, and computer program products for scaling of video images.

BACKGROUND

It is known to use a "scaler" to increase/decrease the size of a video image by changing a corresponding video signal (formatted for either interlaced or progressive scanning) to provide a scaled video signal that will generate a correspondingly sized (larger/smaller) video image. In contrast, as known by those skilled in the art, a scaler is different from a "deinterlacer" that may change an interlaced formatted video signal to a progressive formatted video signal.

For example, when a video signal of an image is displayed at a 640×480 resolution on a 14-inch monitor, the image may appear relatively clear. However, if the same video signal is provided (at the same resolution) to a 40-inch monitor, the image may be less clear. This situation is caused because the data included in the video signal is spaced apart more on the 40 inch monitor than on the 14 inch monitor.

It is known to create additional data (not included in the original video signal) to be added to the original video signal for display on a higher resolution monitor. The additional data can be created by a process that is referred to as "interpolation" As is known by those skilled in the art, interpolation can be used to create additional data (i.e., interpolated data) that is included between two adjacent pieces of known data. For example, a relatively clear image may be provided to the above 40 inch monitor by creating interpolated data for display when the image size is scaled from 640×480 to 1600×1200. In other words, the number of vertical lines in the displayed image is increased from 480 to 1200 when scaling the image to the 40 inch monitor. Accordingly, the interpolated data can be provided as the pixels which would otherwise be missing from a line of the display if only the original 480 pixels were displayed on the 40 inch monitor.

Linear interpolation using a scaler is discussed, for example, in U.S. Pat. No. 5,793,379, entitled Method and apparatus for scaling images having a plurality of scan lines of pixel data, to Lapidous. As discussed in Lapidous, interpolation data is obtained by filtering existing pixel data using a linear low-pass filter (LPF), weighting the LPF-filtered pixel data, and averaging the result. Additionally, interpolation data, which is close to actual data, can be provided by performing interpolation using a polynomial as discussed, for example, in *Multirate Digital Filters, Filter Banks, Polyphase Networks, and Applications* by Vaidyanathan, a collection of international learned papers, proc. IEEE, vol. 78, January 1990.

SUMMARY

Embodiments according to the invention can provide methods, circuits, and computer program products for generating interpolated display data using remote pixel data. Pursuant to these embodiments, interpolated pixel data can be provided by determining a pixel value at an interpolation location of a display based on filtering pixel data proximate to the interpolation location in a plurality of directions from the interpolation location.

In some embodiments according to the invention, the plurality of directions includes more than two different directions. In some embodiments according to the invention, the plurality of directions includes about seven different directions.

In some embodiments according to the invention, determining includes low-pass filtering the data proximate to the interpolation location to determine a direction of interpolation at the interpolation location, filtering the direction of interpolation to determine pixel data values at points on a line that intersects horizontal or vertical lines of the display, and filtering the pixel data values at the points to provide an interpolated pixel value at the location of interpolation.

In some embodiments according to the invention, filtering the direction of interpolation includes applying Lagrangian or polyphase filtering to the direction of interpolation. In some embodiments according to the invention, filtering the pixel data values includes applying Lagrangian or polyphase filtering to the direction of interpolation.

In some embodiments according to the invention, low-pass filtering includes weighting pixel values of the data proximate to the interpolation location differently based on different spatial relations between a location of the pixel value and the interpolation location.

In some embodiments according to the invention, an image signal scaling apparatus can determine a direction of interpolation of a location to be interpolated from two directions obtained from the pixels immediately above and below the interpolation location, applying a weighted value according to the distance between the interpolation location and the upper and lower pixels, calculating pixel data at intersections of horizontal (or vertical) lines and an extended line extending from the interpolation location in the interpolation direction using a Lagrangian filter, a polyphase filter, or a polynomial filter, interpolating the calculated pixel data using the polynomial filter, etc., and obtaining final interpolation data of the interpolation location.

In some embodiments according to the invention, a direction of interpolation of a location to be interpolated can be determined from two directions obtained from the pixels immediately above and below the interpolation location, applying a weighted value according to the distance between the interpolation location and the upper and lower pixels, calculating pixel data at intersections of horizontal (or vertical) lines and an extended extending from the interpolation location in the interpolation direction using a Lagrangian filter, a polyphase filter, or a polynomial filter, interpolating the calculated pixel data using the polynomial filter, etc., and obtaining final interpolation data of the interpolation location.

In some embodiments according to the invention, According to an aspect of the invention, there is provided a scaling interpolator comprising a direction determination unit and a directional interpolator.

The direction determination unit receives and LPF (low-pass filter) filters pixel data on a plurality of lines passing through an interpolation location and determines a direction value, which is used for a direction of interpolation at the interpolation location from the LPF-filtered data, and outputs the direction value.

The directional interpolator calculates pixel data of intersections of horizontal (or vertical) lines and an extended line, which extends in the direction of interpolation from the point of interpolation, using Lagrangian or polyphase filtering, applies Lagrangian or polyphase filtering to the calculated pixel data on the extended line, and obtains and outputs interpolation data of the interpolation location.

The LPF-filtering is performed by an LPF with the property:

$$x'(i, j) = \frac{x(i-1, j) + 6 \times x(i, j) + x(i+1, j)}{8},$$

wherein x'(i, j) is the filtered data and x(i, j) is pixel data at the i-th row and j-th column.

The direction of the interpolation location is determined by a direction value that is linearly changed between a direction value of a pixel P1 above (or to the left of) the interpolation location and a direction value of a pixel P2 below (or to the right of) the interpolation location according to the interpolation location, if the direction values of two pixels P1 and P2 above and below the interpolation location are each represented by seven values of 1 through 7.

The direction value of the pixel is determined by:

$$If |W_{dir_{GLOBAL}} \cdot Pe_{dir_{GLOBAL}} - W_{dir_{LOCAL}} \cdot Pe_{dir_{LOCAL}}| < T$$

$$DIR_i = DIR_{LOCAL},$$

else $$DIR_i = DIR_{GLOBAL},$$

where, $$Pe_{dir} = \sum_{k=0}^{n-1} a|x'_p(i, j:k) - x'(i, j)|$$

is used to calculate a difference between the LPF-filtered data and the updated pixel data, $$W_{dir} = \begin{cases} 1.0 & dir = 1 \\ 1.25 & dir = 2, 3 \\ 1.375 & dir = 4, 5 \\ 1.5 & dir = 6, 7 \end{cases}$$

is used for calculating a weighted value, and $$DIR_{LOCAL} = \underset{dir}{ARG} \left\{ \min_{1 \leq dir \leq 3} (W_{dir} \times Pe_{dir}) \right\} \text{ and } DIR_{GLOBAL} =$$

$$\underset{dir}{ARG} \left\{ \min_{1 \leq dir \leq 7} (W_{dir} \times Pe_{dir}) \right\}$$

are used to calculate the direction value according to the minimal value of $W_{dir} \times Pe_{dir}$;

wherein, k is a reference index representing one of five pairs of pixels, x'(i, j) is the LPF-filtered pixel data, x'$_p$(i, j:k) is the average value of the pixel data corresponding to the reference index k for data situated about the reference pixel in each of the seven directions, a is a weighted value according to k, wherein a=2 if k is the value corresponding to the pair centered around the reference pixel, and a=1 otherwise, $DIR_{LOCAL}$ is a local direction value, $DIR_{GLOBAL}$ is a global direction value, $DIR_i$ is a final direction value, and T is a constant representing a threshold value that depends on an image noise.

According to another aspect of the invention, there is provided a digital image signal scaling apparatus comprising a memory unit, a scaling interpolator, and a controller. The memory unit receives input pixel data, updates and stores the pixel data on a plurality of lines passing through an interpolation location, and outputs the updated pixel data in response to a control signal.

The scaling interpolator determines a direction of interpolation of the interpolation location from LPF-filtered data of the updated pixel data in response to the control signal, calculates pixel data at intersections of horizontal (or vertical) pixel lines and an extended line, which extends in the direction of interpolation from the point of interpolation using Lagrangian or polyphase filtering, applies Lagrangian or polyphase filtering to the calculated pixel data on the extended line, and obtains and outputs interpolation data of the interpolation location.

The controller generates the control signal, which controls the LPF-filtering, and the Lagrangian filtering or polyphase filtering.

The scaling interpolator comprises a direction determination unit and a directional interpolator. The direction determination unit LPF-filters the updated pixel data in response to the control signal, determines the direction value which corresponds to the direction of interpolation of the interpolation location from the LPF-filtered data, and outputs the direction value. The directional interpolator calculates the pixel data of the intersections of the horizontal (or vertical) lines and the extended line using Lagrangain or polyphase filtering in response to the control signal, applies Lagrangian filtering or polyphase filtering to the calculated pixel data, and obtains and outputs the interpolation data of the interpolation location.

According to still another aspect of the invention, there is provided a scaling interpolation method comprising: receiving and LPF-filtering pixel data on a plurality of lines passing through an interpolation location and determining a direction value, which is used for a direction of interpolation at the interpolation location from the LPF-filtered data and outputting the direction value; calculating pixel data of respective intersections of horizontal (or vertical) lines and an extended line which extends in the direction of interpolation from the interpolation location using Lagrangian or polyphase filtering; applying Lagrangian or polyphase filtering to the calculated pixel data on the extended line; and obtaining and outputting interpolation data of the interpolation location.

According to still yet another aspect of the invention, there is provided a method of scaling a digital image signal, comprising: receiving input pixel data, updating and storing pixel data on a plurality of lines passing through an interpolation location, and outputting the updated pixel data in response to a control signal; determining a direction of interpolation of the interpolation location from LPF-filtered data of the updated pixel data in response to the control signal, calculating pixel data at intersections of horizontal (or vertical) lines and, which extends in the direction of interpolation from the interpolation location using Lagrangian or polyphase filtering, applying Lagrangian or polyphase filtering to the calculated pixel data on the extended line, and obtaining and outputting interpolation data of the interpolation location; and generating the control signal, which controls the LPF filtering, and the Lagrangian filtering or polyphase filtering.

The scaling interpolation further comprises: LPF-filtering the updated pixel data in response to the control signal and determining the direction value, which corresponds to the direction of interpolation of the interpolation location from the LPF-filtered data, and outputting the direction value; and calculating the pixel data of the intersections of the horizontal (or vertical) lines and the extended line corresponding to the direction value using Lagrangian or polyphase filtering in response to the control signal, applying Lagrangian or polyphase filtering to the calculated pixel data, and obtaining and outputting the interpolation data of the interpolation location.

Related computer program product embodiments according to the invention are also within the scope of the invention.

DETAILED DESCRIPTION OF EMBODIMENTS ACCORDING TO THE INVENTION

Figure 1:
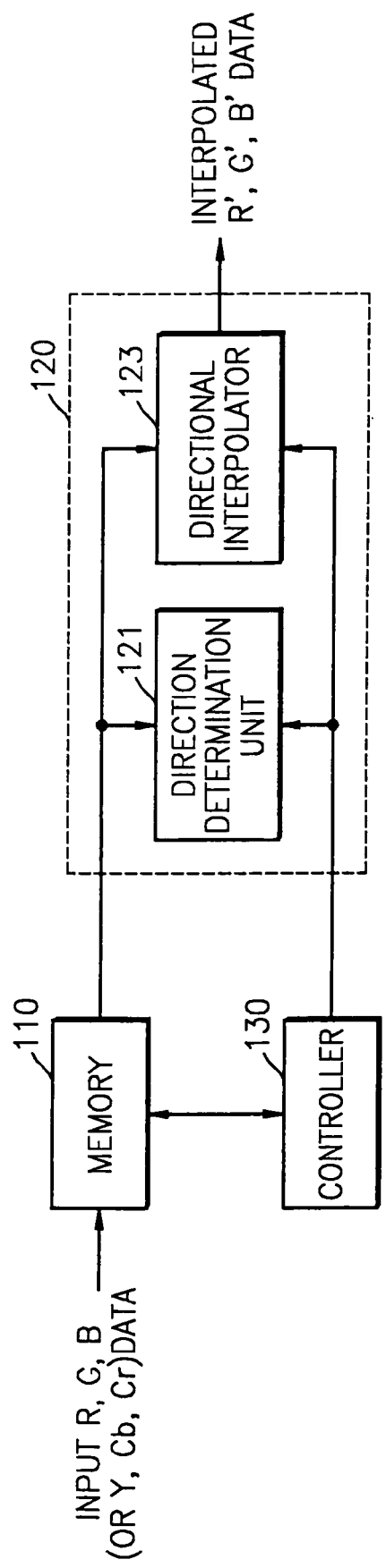
FIG. 1 is a block diagram of a scaling apparatus according to some embodiments of the invention.

The invention is described herein with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers and reference designators refer to like elements throughout.

As will be appreciated by one of skill in the art, the invention may be embodied as methods, systems, and/or computer program products. Accordingly, the invention may take the form of an entirely hardware embodiment, an entirely software embodiment or an embodiment combining software and hardware aspects. Furthermore, the invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code or "code" for carrying out operations according to the invention may be written in an object oriented programming language such as JAVA®, or in various other programming languages. Software embodiments of the invention do not depend on implementation with a particular programming language. Portions of the code may execute entirely on one or more systems utilized by an intermediary server.

The code may execute entirely on one or more servers, or it may execute partly on a server and partly on a client within a client device or as a proxy server at an intermediate point in a communications network. In the latter scenario, the client device may be connected to a server over a LAN or a WAN (e.g., an intranet), or the connection may be made through the Internet (e.g., via an Internet Service Provider). It is understood that the invention is not TCP/IP-specific or Internet-specific. The invention may be embodied using various protocols over various types of computer networks.

The invention is described below with reference to diagram illustrations of methods, systems and computer program products according to embodiments of the invention. It is understood that each element shown in the diagrams (i.e., flow diagrams), and combinations of elements in the diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the diagram element or elements.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the diagram element or elements.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the diagram block or blocks.

FIG. 1 is a block diagram of a scaling apparatus according to some embodiments of the invention. Referring to FIG. 1, the scaling apparatus includes a memory unit 110, a scaling interpolator 120, and a controller 130. It will be understood that the controller 130 can be a processor, such as a microprocessor or digital signal processor, that is capable of executing computer program instructions to carry out the operations disclosed herein. The memory unit 110 receives input pixel data (such as R, G, B structured data or Y, Cb, Cr structured data) corresponding to a plurality of lines of a display device on which the input pixel data is formatted for display. The memory unit 110 updates and stores the input pixel data. It will be understood that the display device can be, for example, a Liquid Crystal Display (LCD), a Cathode Ray Tube (CRT) or some other display device capable of displaying information.

The memory unit 110 outputs the pixel data corresponding to the plurality of lines of the display around an interpolation location in response to a control signal output from the controller 110. The output pixel data on the plurality of lines around the interpolation location is data required for obtaining interpolation data at the interpolation location (black square dot shown in FIG. 3 through FIG. 5). If a pixel at the interpolation location displays R, G, or B color, the pixel data on the plurality of lines required for obtaining interpolation data at the interpolation location is also R, G, or B digital data.

The scaling interpolator 120 applies a low pass filter (LPF) to pixel data included in lines proximate to (e.g., surrounding) the location of interpolation (i.e., the location on the display for which pixel data is to be interpolated). The scaling interpolator 120 determines a direction of interpolation at the interpolation location based on the LPF-filtered data in response to the control signal. The scaling interpolator 120 calculates pixel data for locations on the display where a line representing the direction of interpolation intersects horizontal (or vertical) lines of the display. In some embodiments according to the invention, the pixel data is determined using Lagrangian filtering or polyphase filtering. The determined pixel data at the intersecting points on the line are filtered to calculate pixel data corresponding to the location of interpolation. In some embodiments according to the invention, Lagrangian or polyphase filtering is used to provide the calculated pixel data corresponding to the location of interpolation. It will be understood that the data can be monochromatic or polychromatic pixel data (e.g., R', G' or B') for the interpolation location.

The controller 130 generates the control signal that controls the LPF filtering and the Lagrangian or polyphase filtering. Referring to FIG. 1, the scaling interpolator 120 includes a direction determination unit 121 and a directional interpolator 123. The direction determination unit 121 LPF-filters the pixel data on the plurality of lines proximate to the interpolation location in response to the control signal, and determines a direction of interpolation at the interpolation location based on the LPF-filtered data. The directional interpolator unit 123 calculates pixel data at the respective intersections of the horizontal (or vertical) pixel lines and the extended line in the direction of interpolation by Lagrangian filtering or polyphase filtering in response to the control signal, and then applies the Lagrangian or polyphase filtering to the calculated pixel data on the extended line, thereby obtaining and outputting interpolation data (R', G' or B' data) for the interpolation location.

In some embodiments according to the invention, LPF-filtering is performed by a Low Pass Filter (LPF) according to Equation 1, thus obtaining filtering data x'(i, j). That is, as seen in equation 1, filtered data x'(i, j), at a location (i, j) to be filtered, is obtained by adding pixel data x(i+1, j) and x(i−1, j) existing on the horizontal lines that are above and below the interpolation location to 6 times the pixel data x(i, j) at the interpolation location (i, j) and averaging the added result.

$$x'(i, j) = \frac{x(i-1, j) + 6 \times x(i, j) + x(i+1, j)}{8} \quad (1)$$

(Here, x'(i, j) is the LPF-filtered data and x(i, j) is pixel data in the i-th row and j-th column).

Figure 2:
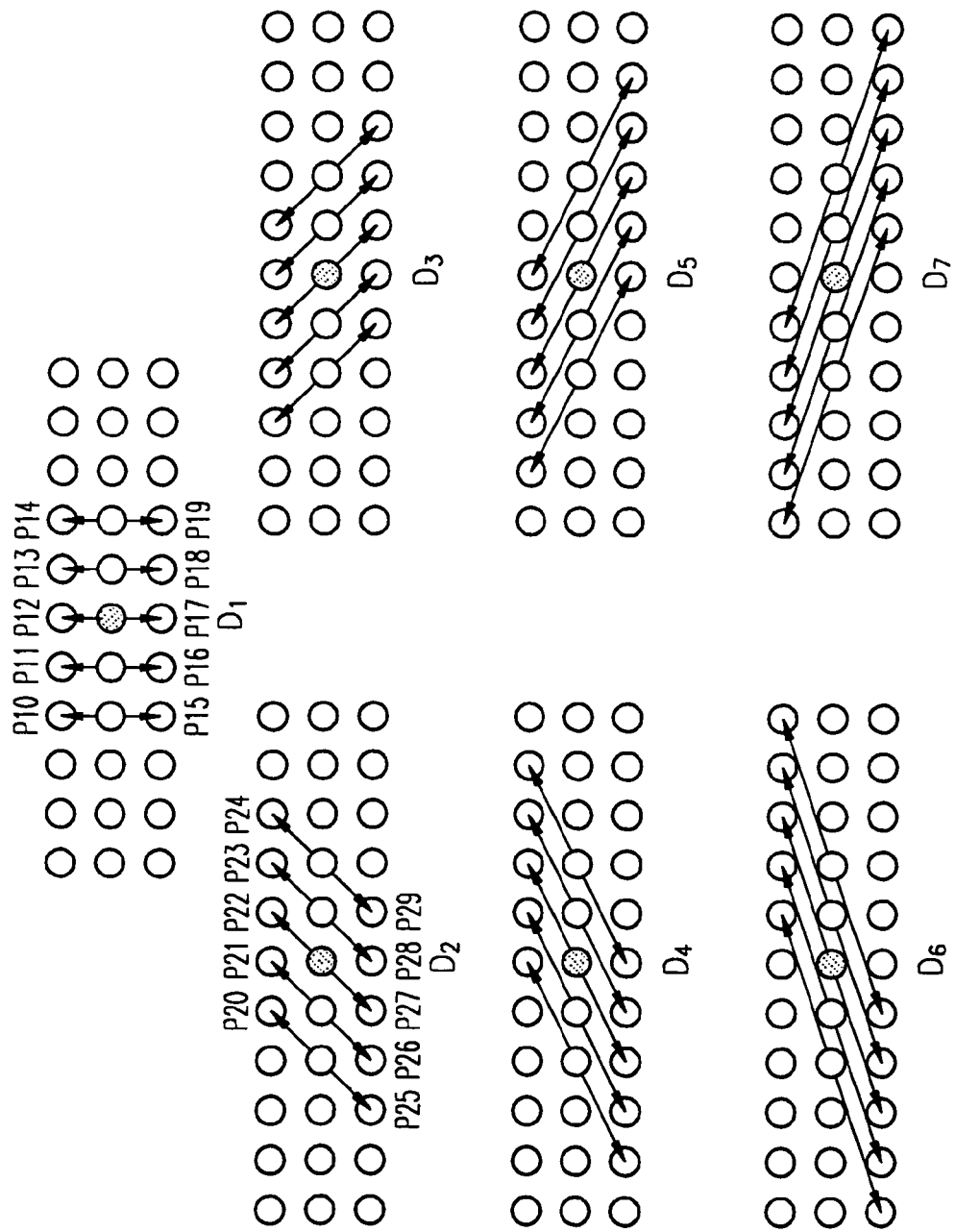
FIG. 2 illustrates seven directions of interpolation applicable to pixels according to some embodiments of the invention.

FIG. 2 illustrates seven directions in which a pixel can be interpolated. Referring to FIG. 2, directions of interpolation of a pixel are determined using Equation 5, along with Equation 2, which calculates differences between the LPF-filtered data and pixel data existing for each seven direction D1 through D7 for an interpolation location, Equation 3, which calculates weighted values, and Equation 4 which calculates the direction value corresponding to a minimal value of $W_{dir} \times Pe_{dir}$. In Equation 4 or 5, $DIR_{LOCAL}$, $DIR_{GLOBAL}$, and $DIR_i$, which represent direction values can each have one of seven values 1 through 7, representing the seven directions denoted by D1 through D7, respectively. Also, in Equation 2, $x'_p(i, j)$ is an average value of pixel data for data pairs situated around a reference pixel (five data pairs in total) for each of the seven directions. For example, in FIG. 2, a black dot represents the location (i, j) of the reference pixel at an interpolation location, (i.e., the pixel at a location for which data is to be interpolated.) In the direction of D1, $Pe_1$ represents the absolute value of "{[(P10+P15)/2−x'(i, j)]+[(P11+P16)/2−x'(i, j)]+2*[(P12+P17)/2−x'(i, j)]+[(P13+P18)/2−x'(i, j)]+[(P14+P19)/2−x'(i, j)]}." In the direction of D2, $Pe_2$ represents the absolute value of "{[(P20+P25)/2−x'(i, j)]+[(P21+P26)/2−x'(i, j)]+2*[(P22+P27)/2−x'(i, j)]+[(P23+P28)/2−x'(i, j)]+[(P24+P29)/2]−x'(i, j)]}." This expression is applied to seven directions D1 to D7 as follows:

$$Pe_{dir} = \sum_{k=0}^{n-1} a|x'_p(i, j:k) - x'(i, j)| \quad (2)$$

(Here, k is a reference index representing one of five pairs of pixels, x'(i, j) is the LPF-filtered pixel data, $x'_p(i, j:k)$ is the average value of the pixel data corresponding to the reference index k (five data pairs in total) for data situated about the reference pixel in each of the seven directions, and a is a weighted value according to k, wherein a=2 if k is the value corresponding to the pair centered around the reference pixel, and a=1 otherwise).

$$W_{dir} = \begin{cases} 1.0 & dir = 1 \\ 1.25 & dir = 2, 3 \\ 1.375 & dir = 4, 5 \\ 1.5 & dir = 6, 7 \end{cases} \quad (3)$$

$$DIR_{LOCAL} = \underset{dir}{ARG} \left\{ \min_{1 \le dir \le 3} (W_{dir} \times Pe_{dir}) \right\} \quad (4)$$

$$DIR_{GLOBAL} = \underset{dir}{ARG} \left\{ \min_{1 \le dir \le 7} (W_{dir} \times Pe_{dir}) \right\}$$

(Here, $DIR_{LOCAL}$ is a local direction value and $DIR_{GLOBAL}$ is a global direction value).

If $W_{dir_{GLOBAL}} \cdot Pe_{dir_{GLOBAL}} - W_{dir_{LOCAL}} \cdot Pe_{dir_{LOCAL}} < T$ $DIR_i = DIR_{LOCAL}$ else $DIR_i = DIR_{GLOBAL}$ \quad (5)

(Here, $DIR_i$ is a final direction value and T is a constant representing a threshold value that depends on image noise).

In Equation 4, the direction values that correspond to the minimal values of $W_{dir} \times Pe_{dir}$ are the local direction value $DIR_{LOCAL}$ and the global direction value $DIR_{GLOBAL}$. The local direction value $DIR_{LOCAL}$ corresponds to a minimal value $W_{dir} \times Pe_{dir}$ obtained considering all of D1 through D3. The global direction value $DIR_{GLOBAL}$ corresponds to a minimal value $W_{dir} \times Pe_{dir}$ obtained considering all of D1 through D7. In Equation 5, the threshold value T depends on the image noise.

Figure 3:
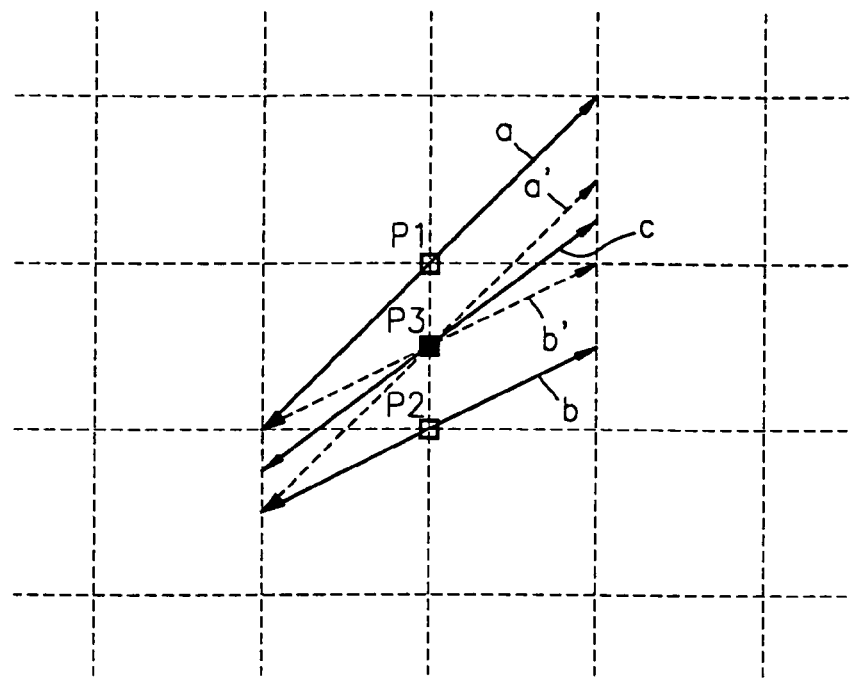
FIG. 3 is a schematic representation of directions at a center location of existing pixels according to some embodiments of the invention.

FIG. 3 is a diagram illustrating a determination of an interpolation direction at an interpolation point according to some embodiments of the invention. Referring to FIG. 3, when the direction values of two pixels P1 and P2, located above and below (left and right in a case of horizontal scaling) an interpolation location P3, are each represented by seven direction values 1 through 7, the direction of interpolation of the interpolation location P3 linearly changes between the direction value of the upper (or left) pixel P1 and the direction value of the lower (or right) pixel P2 according to the location of the interpolation location P3.

In FIG. 3, it is assumed that the interpolation location P3 is centered between the pixels P1 and P2. In this case, the direction of interpolation at the interpolation location P3 is determined to be a direction of a vector c that is obtained by summing a vector a', obtained by parallel-translating a vector a corresponding to the direction of interpolation of the upper pixel P1, and a vector b', obtained by parallel-translating a vector b corresponding to the direction value of the lower pixel P2. At this time, since the direction at the interpolation location P3 linearly changes between the direction of the pixel P1 and the direction of the pixel P2, the direction of interpolation at the interpolation location P3 is determined more by the direction value of pixel P1 than the direction value of pixel P2 if the interpolation location P3 is located closer to the pixel P1, differently from FIG. 3. If the interpolation location P3 is located closer to the pixel P2, the direction of interpolation at the interpolation location P3 is determined more by the direction value of the pixel P2. This calculation is implemented by weighting the direction values of the pixels P1 and P2 according to the distances of the pixels P1 and P2 from the interpolation location.

Figure 4:
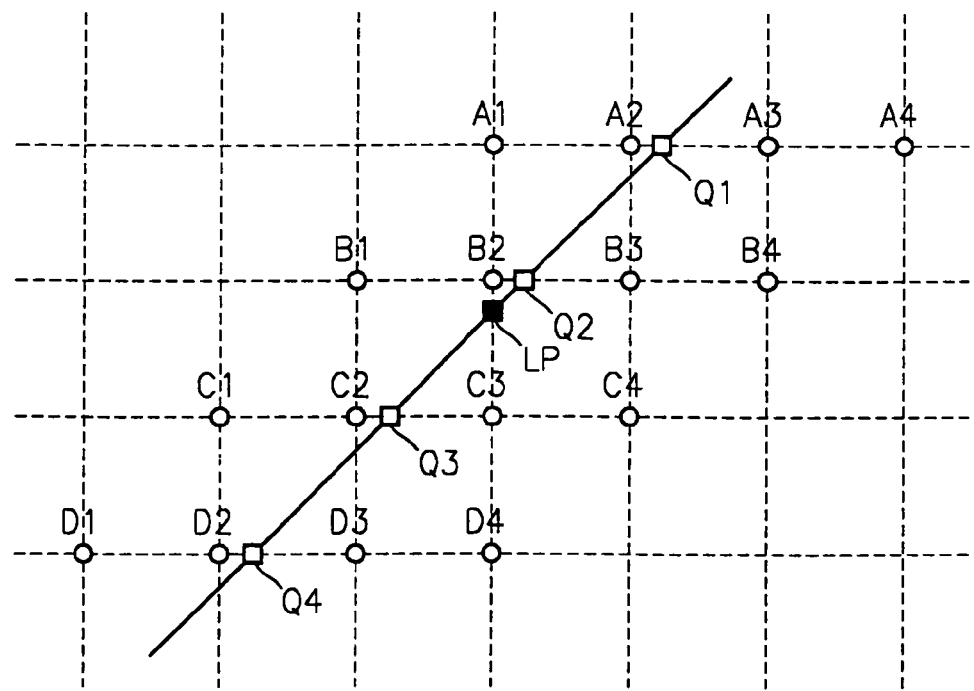
FIG. 4 is a schematic representation of polynomial filtering according to some embodiments of the invention.

FIG. 4 is a diagram illustrating the application of Lagrangian filtering or polyphase filtering to grey values of points according to some embodiments of the invention. In particular, filtering is applied to the points where horizontal lines intersect a line corresponding to the direction of interpolation. In some embodiments according to the invention, the filtering is performed using Lagrangian filtering or polyphase filtering of the line. FIG. 4 shows an example of applying Lagrangian or polyphase filtering to the grey values of the intersections of the horizontal lines and the extended line for vertical scaling, however, it is also possible to obtain interpolation data for horizontal scaling by applying Lagrangian or polyphase filtering to grey values of intersections of the vertical lines and the extended line using the same method.

Referring still to FIG. 4, interpolation data (R', G', or B' data) can be calculated from pixel data at four points near the interpolation location, however, the number of points near the interpolation location may vary. Since the complexity of hardware, such as memory, required for interpolation increases if the number of selected points around the interpolation location increase, the number of selected points around the interpolation location can be adjusted based on the type of hardware and/or software used.

Referring to FIG. 4, the directional interpolator unit 123 calculates pixel data Q1 through Q4 of the respective intersections on horizontal pixel lines intersecting an extended line extending in a direction of interpolation of an interpolation location LP from the interpolation location LP, using a Lagrangian or polyphase filter which perform Lagrangian or polyphase filtering such as in equations 6 and 7. The directional interpolator 123 applies Lagrangian or polyphase filtering to the calculated pixel data Q1 through Q4 on the extended line once more, and obtains and outputs interpolation data (R', G', or B' data) of the interpolation location LP. Lagrangian or polyphase filtering obtains interpolation data by using an n-th degree polynomial that passes through the n+1 points x(i) for i=0, . . . , n.

$$L_i(t) = \prod_{k=0, k \neq i}^{n} \frac{t-k}{i-k} \quad (6)$$

(Here, n is the number of pixels to be used for interpolation and t is a distance from a first pixel of the n pixels to the intersection location).

$$p_n(t) = \sum_{i=0}^{n} L_i(i)x(i) \quad (7)$$

(Here, x(i) is pixel data at the respective intersections).

For example, in FIG. 4, data Q1 is obtained by applying Lagrangian or polyphase filtering to data A1 through A4. At this time, since four pixel data A1 through A4 exist corresponding to four points, n=4 and t represents the distance from the point A1 to the point Q1 is about 1.2. Likewise, pixel data Q2 through Q4 at each of the remaining intersections of the horizontal pixel lines and the extended line are calculated. Interpolation data (R', G', or B' data) at the interpolation location LP is calculated by applying Lagrangian or polyphase filtering to the pixel data Q1 through Q4.

Figure 5A:
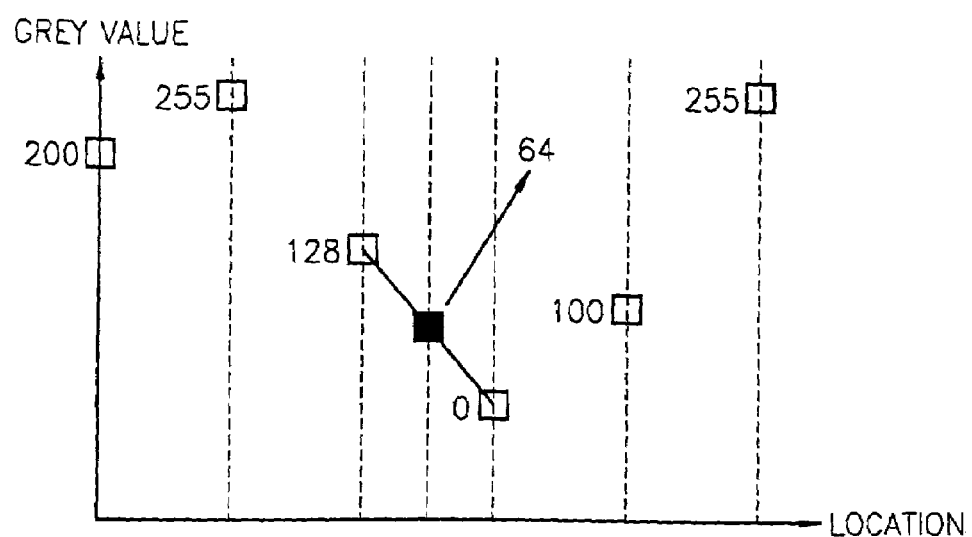
FIG. 5A is a schematic representation of interpolated grey values obtained by linear interpolation according to a conventional approach.
Figure 5B:
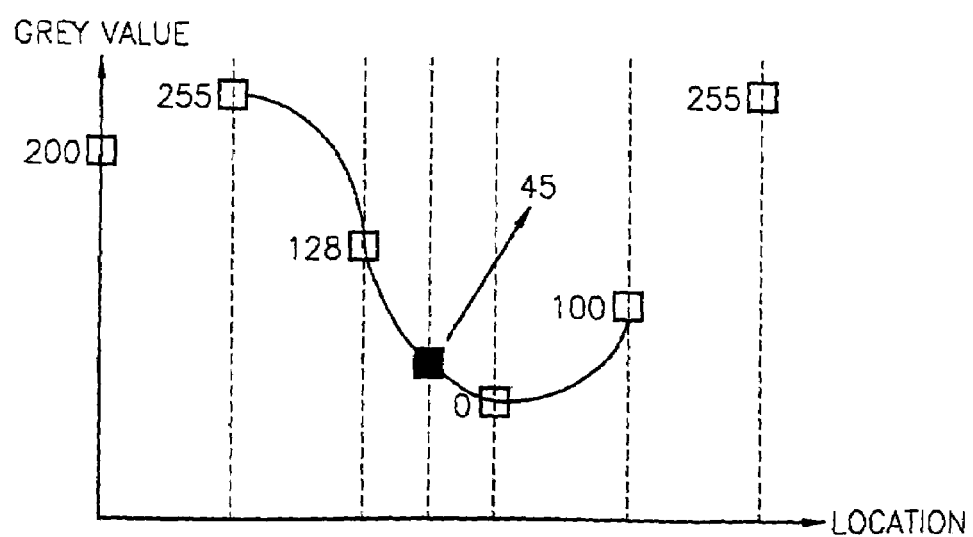
FIG. 5B is a schematic representation of interpolated grey values obtained by interpolation according to some embodiments according to the invention.

FIGS. 5A and 5B are diagrams illustrating interpolation of grey values obtained by linear interpolation according to a conventional technique and interpolation of grey values obtained by interpolation according to embodiments of the invention, respectively. That is, assuming that grey values of the 8-bit pixel data Q1 through Q4 are 255, 128, 0, and 100, respectively, and the interpolation location (black dot) is located between the pixels that have values of 128 and 0, the grey value of the interpolation data (R',G', or B' data) is 64 in FIG. 5A, whereas the grey value of the interpolation data in FIG. 5B is 45.

The result shown in FIG. 5A occurs because of linear interpolation that interpolates only the grey values 128 and 0 of the two pixels located nearest the interpolation location. In FIG. 5B, the interpolation is performed with Lagrangian or polyphase filtering using four points around the interpolation location. Since the interpolation result of FIG. 5B is closer to an actual phenomenon, it is possible to reduce distortion occurring when the linear interpolation is performed for edges of an image, curved images, texture patterns, etc., and improve display resolution.

As described above, the direction determination unit 121 of the scaling interpolator 120 according to some embodiments of the invention LPF-filters pixel data proximate to an interpolation location (i.e., a location at which data is to be interpolated). The LPF-filtered data is used to determine a direction of interpolation at the interpolation location. Accordingly, the directional interpolator 123 calculates pixel data for locations at which a line extending in the direction of interpolation intersects horizontal (or vertical) lines of the display. The determined pixel data (at the intersections) is filtered again, using, for example Lagrangian or polyphase filtering, to provide interpolation data (R', G' and B' data) at the interpolation location. The R', G' and B' data as the interpolation data can be included in the video signal for display as an image on the display.

As disclosed above, the digital image signal scaling apparatus according to some embodiments of the invention, determines a direction of interpolation at a location to be interpolated, calculates pixel data at locations where a line representing the direction of interpolation intersections horizontal (or vertical) lines of the display using a polyphase, Lagrangian, or polyphase polynomial filter, etc. The calculated pixel data is filtered again, using for example, Lagrangian or polynomial filtering, etc. to generate interpolation data at the interpolation location.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed:

1. An apparatus that scales a digital image signal comprising:

a memory unit, which receives originally formatted input pixel data, updates and stores the pixel data on a plurality of lines passing through an interpolation location, and outputs the updated pixel data in response to a control signal;

a scaling interpolator, which determines a direction of interpolation of the interpolation location from LPF-filtered data of the updated pixel data in response to the control signal, calculates pixel data values at points where an extended line that passes through the interpolation location and extending in the direction of interpolation intersects horizontal or vertical lines of the display using Lagrangian or polyphase filtering wherein the points are not included in the originally formatted input pixel data, applies Lagrangian filtering to the calculated pixel data on the extended line, and obtains and outputs interpolation data of the interpolation location to provide an interpolated pixel value to a display to provide a scaled-up image thereon compared to the originally formatted input pixel data; and a controller which generates the control signal, which controls the LPF-filtering, and the Lagrangian filtering or polyphase filtering, wherein the scaling interpolator comprises:

a direction determination unit, which LPF-filters the updated pixel data in response to the control signal, determines the direction value which corresponds to the direction of interpolation of the interpolation location from the LPF-filtered data, and outputs the direction value; and a directional interpolator, which calculates the pixel data values of the intersections of the horizontal (or vertical) lines and the extended line using Lagrangian in response to the control signal, applies Lagrangian filtering to the calculated pixel data, and obtains and outputs the interpolation data of the interpolation location, wherein the LPF filtering is performed by an LPF with the property:

$$x'(i, j) = \frac{x(i-1, j) + 6 \times x(i, j) + x(i+1, j)}{8},$$

wherein x'(i, j) is the filtered data and x(i, j) is pixel data at the i-th row and j-th column.

2. The apparatus of claim 1, wherein the direction of interpolation is determined by a direction value that is linearly changed between a direction value of a pixel P1 above (or to the left of) the interpolation location and a direction value of a pixel P2 below (or to the right of) the interpolation location according to the interpolation location, if the direction values of two pixels P1 and P2 above and below the interpolation location are each represented by seven values of 1 through 7.

3. An apparatus that scales a digital image signal comprising:

a memory unit, which receives originally formatted input pixel data, updates and stores the pixel data on a plurality of lines passing through an interpolation location, and outputs the updated pixel data in response to a control signal;

a scaling interpolator, which determines a direction of interpolation of the interpolation location from LPF-filtered data of the updated pixel data in response to the control signal, calculates pixel data values at points where an extended line that passes through the interpolation location and extending in the direction of interpolation intersects horizontal or vertical lines of the display using Lagrangian or polyphase filtering wherein the points are not included in the originally formatted input pixel data, applies Lagrangian filtering to the calculated pixel data on the extended line, and obtains and outputs interpolation data of the interpolation location to provide an interpolated pixel value to a display to provide a scaled-up image thereon compared to the originally formatted input pixel data; and a controller which generates the control signal, which controls the LPF-filtering, and the Lagrangian filtering or polyphase filtering, wherein the scaling interpolator comprises:

a direction determination unit, which LPF-filters the updated pixel data in response to the control signal, determines the direction value which corresponds to the direction of interpolation of the interpolation location from the LPF-filtered data, and outputs the direction value; and a directional interpolator, which calculates the pixel data values of the intersections of the horizontal (or vertical) lines and the extended line using Lagrangian in response to the control signal, applies Lagrangian filtering to the calculated pixel data, and obtains and outputs the interpolation data of the interpolation location, wherein the direction of interpolation is determined by a direction value that is linearly changed between a direction value of a pixel P1 above (or to the left of) the interpolation location and a direction value of a pixel P2 below (or to the right of) the interpolation location according to the interpolation location, if the direction values of two pixels P1 and P2 above and below the interpolation location are each represented by seven values of 1 through 7, wherein the direction value of the pixel is determined by:

$$If |W_{dir_{GLOBAL}} \cdot Pe_{dir_{GLOBAL}} - W_{dir_{LOCAL}} \cdot Pe_{dir_{LOCAL}}| < T$$

$$DIR_i = DIR_{LOCAL},$$

else $$DIR_i = DIR_{GLOBAL},$$

where, $$Pe_{dir} = \sum_{k=0}^{n-1} a|x'_p(i, j:k) - x'(i, j)|$$

is used to calculate a difference between the LPF-filtered data and the updated pixel data, $$W_{dir} = \begin{cases} 1.0 & dir = 1 \\ 1.25 & dir = 2, 3 \\ 1.375 & dir = 4, 5 \\ 1.5 & dir = 6, 7 \end{cases}$$

is used for calculating a weighted value, and $$DIR_{LOCAL} = \underset{dir}{ARG}\left\{\underset{1 \leq dir \leq 3}{\min}(W_{dir} \times Pe_{dir})\right\} \text{ and } DIR_{GLOBAL} = \underset{dir}{ARG}\left\{\underset{1 \leq dir \leq 7}{\min}(W_{dir} \times Pe_{dir})\right\}$$

are used to calculate the direction value according to the minimal value Of $W_{dir} \times Pe_{dir}$;

wherein, k is a reference index representing one of five pairs of pixels, x'(i, j) is the LPF-filtered pixel data, $x'_p(i, j:k)$ is the average value of the pixel data corresponding to the reference index k for data situated about the reference pixel in each of the seven directions, a is a weighted value according to k, wherein a=2 if k is the value corresponding to the pair centered around the reference pixel, and a=1 otherwise, $DIR_{LOCAL}$ is a local direction value, $DIR_{GLOBAL}$ is a global direction value, $DIR_i$ is a final direction value, and T is a constant representing a threshold value that depends on an image noise.

4. An apparatus that scales a digital image signal comprising:

a memory unit, which receives originally formatted input pixel data, updates and stores the pixel data on a plurality of lines passing through an interpolation location, and outputs the updated pixel data in response to a control signal;

a scaling interpolator, which determines a direction of interpolation of the interpolation location from LPF-filtered data of the updated pixel data in response to the control signal, calculates pixel data values at points where an extended line that passes through the interpolation location and extending in the direction of interpolation intersects horizontal or vertical lines of the display using Lagrangian or polyphase filtering wherein the points are not included in the originally formatted input pixel data, applies Lagrangian filtering to the calculated pixel data on the extended line, and obtains and outputs interpolation data of the interpolation location to provide an interpolated pixel value to a display to provide a scaled-up image thereon compared to the originally formatted input pixel data; and a controller which generates the control signal, which controls the LPF-filtering, and the Lagrangian filtering or polyphase filtering, wherein the scaling interpolator comprises:

a direction determination unit, which LPF-filters the updated pixel data in response to the control signal, determines the direction value which corresponds to the direction of interpolation of the interpolation location from the LPF-filtered data, and outputs the direction value; and a directional interpolator, which calculates the pixel data values of the intersections of the horizontal (or vertical) lines and the extended line using Lagrangian in response to the control signal, applies Lagrangian filtering to the calculated pixel data, and obtains and outputs the interpolation data of the interpolation location, wherein the Lagrangian or the polyphase filtering is performed by a Lagrangian filter or a polyphase filter using:

$$L_i(t) = \prod_{k=0, k \neq i}^{n} \frac{t-k}{i-k} \text{ and}$$

$$p_n(t) = \sum_{i=0}^{n} L_i(i)x(i),$$

wherein n is the number of pixels to be used for interpolation, t is a distance from the first pixel of the n pixels to the intersection location, and x(i) is pixel data at the respective intersections.

5. A scaling interpolation computer implemented method comprising:

receiving and LPF-filtering originally formatted pixel data on a plurality of lines passing through an interpolation location and determining a direction value, which is used for a direction of interpolation at the interpolation location from the LPF-filtered data and outputting the direction value;

calculating pixel data values at points where an extended line that passes through the interpolation location and extending in the direction of interpolation intersects horizontal or vertical lines of the display using Lagrangian or polyphase filtering wherein the points are not included in the originally formatted pixel data;

applying Lagrangian filtering to the calculated pixel data on the extended line; and obtaining and outputting interpolation data of the interpolation location to provide an interpolated pixel value to a display to provide a scaled-up image thereon compared to the originally formatted input pixel data, wherein the Lagrangian or the polyphase filtering is performed by a Lagrangian filter or a polyphase filter using:

$$L_i(t) = \prod_{k=0, k \neq i}^{n} \frac{t-k}{i-k} \text{ and}$$

$$p_n(t) = \sum_{i=0}^{n} L_i(i)x(i),$$

wherein n is the number of pixels to be used for interpolation, t is a distance from the first pixel of the n pixels to the intersection location, and x(i) is pixel data at the respective intersections.

6. A scaling interpolation computer implemented method comprising:

receiving and LPF-filtering originally formatted pixel data on a plurality of lines passing through an interpolation location and determining a direction value, which is used for a direction of interpolation at the interpolation location from the LPF-filtered data and outputting the direction value;

calculating pixel data values at points where an extended line that passes through the interpolation location and extending in the direction of interpolation intersects horizontal or vertical lines of the display using Lagrangian or polyphase filtering wherein the points are not included in the originally formatted pixel data;

applying Lagrangian filtering to the calculated pixel data on the extended line; and obtaining and outputting interpolation data of the interpolation location to provide an interpolated pixel value to a display to provide a scaled-up image thereon compared to the originally formatted input pixel data, wherein the LPF filtering is performed by an LPF with the property:

$$x'(i, j) = \frac{x(i-1, j) + 6 \times x(i, j) + x(i+1, j)}{8},$$

wherein x'(i, j) is the filtered data and x(i, j) is pixel data at the i-th row and j-th column.

7. The method of claim 5 wherein the direction of interpolation is determined by a direction value that is linearly changed between a direction value of a pixel P1 above (or to the left of) the interpolation location and a direction value of a pixel P2 below (or to the right of) the interpolation location according to the interpolation location, if the direction values of the two pixels P1 and P2 above and below the interpolation location are each represented by seven values of 1 through 7.

8. A scaling interpolation computer implemented method comprising:

receiving and LPF-filtering originally formatted pixel data on a plurality of lines passing through an interpolation location and determining a direction value, which is used for a direction of interpolation at the interpolation location from the LPF-filtered data and outputting the direction value;

calculating pixel data values at points where an extended line that passes through the interpolation location and extending in the direction of interpolation intersects horizontal or vertical lines of the display using Lagrangian or polyphase filtering wherein the points are not included in the originally formatted pixel data;

applying Lagrangian filtering to the calculated pixel data on the extended line; and obtaining and outputting interpolation data of the interpolation location to provide an interpolated pixel value to a display to provide a scaled-up image thereon compared to the originally formatted input pixel data, wherein the direction of interpolation is determined by a direction value that is linearly changed between a direction value of a pixel P1 above (or to the left of) the interpolation location and a direction value of a pixel P2 below (or to the right of) the interpolation location according to the interpolation location, if the direction values of the two pixels P1 and P2 above and below the interpolation location are each represented by seven values of 1 through 7, wherein the direction value of the pixel is determined by:

$$If |W_{dir_{GLOBAL}} \cdot Pe_{dir_{GLOBAL}} - W_{dir_{LOCAL}} \cdot Pe_{dir_{LOCAL}}| < T$$

$$DIR_i = DIR_{LOCAL},$$

else $$DIR_i = DIR_{GLOBAL},$$

where, $$Pe_{dir} = \sum_{k=0}^{n-1} a|x'_p(i, j:k) - x'(i, j)|$$

is used to calculate a difference between the LPF-filtered data and the updated pixel data, $$W_{dir} = \begin{cases} 1.0 & dir = 1 \\ 1.25 & dir = 2, 3 \\ 1.375 & dir = 4, 5 \\ 1.5 & dir = 6, 7 \end{cases}$$

is used for calculating a weighted value, and $$DIR_{LOCAL} = ARG\left\{\min_{dir}_{1 \leq dir \leq 3} (W_{dir} \times Pe_{dir})\right\} \text{ and } DIR_{GLOBAL} = ARG\left\{\min_{dir}_{1 \leq dir \leq 7} (W_{dir} \times Pe_{dir})\right\}$$

are used to calculate the direction value according to the minimal value of $W_{dir} \times Pe_{dir}$;

wherein, k is a reference index representing one of five pairs of pixels, x'(i, j) is the LPF-filtered pixel data, x'$_p$(i, j:k) is the average value of the pixel data corresponding to the reference index k for data situated about the reference pixel in each of the seven directions, a is a weighted value according to k, wherein a=2 if k is the value corresponding to the pair centered around the reference pixel, and a=1 otherwise, $DIR_{LOCAL}$ is a local direction value, $DIR_{GLOBAL}$ is a global direction value, $DIR_i$ is a final direction value, and T is a constant representing a threshold value that depends on an image noise.

* * * * *